US011913271B2

(12) United States Patent
Mitchell et al.

(10) Patent No.: US 11,913,271 B2
(45) Date of Patent: Feb. 27, 2024

(54) PIVOT HINGE

(71) Applicant: Kason Industries, Inc., Newnan, GA (US)

(72) Inventors: Brett Mitchell, Newnan, GA (US); Andrew Bassett, Newnan, GA (US)

(73) Assignee: Kason Industries, Inc., Newnan, GA (US)

( * ) Notice: Subject to any disclaimer, the term of this patent is extended or adjusted under 35 U.S.C. 154(b) by 790 days.

(21) Appl. No.: 16/878,961

(22) Filed: May 20, 2020

(65) Prior Publication Data

US 2021/0363804 A1 Nov. 25, 2021

(51) Int. Cl.
*E05D 3/02* (2006.01)
*E05D 11/10* (2006.01)
*E05F 1/12* (2006.01)
*F25D 23/02* (2006.01)

(52) U.S. Cl.
CPC .............. *E05F 1/1223* (2013.01); *E05D 3/02* (2013.01); *E05D 11/1007* (2013.01); *E05D 11/1014* (2013.01); *F25D 23/028* (2013.01); *E05Y 2201/218* (2013.01); *E05Y 2201/484* (2013.01); *E05Y 2600/12* (2013.01); *E05Y 2800/674* (2013.01); *E05Y 2900/31* (2013.01); *F25D 2323/024* (2013.01)

(58) Field of Classification Search
CPC ............. F25D 2323/024; E05D 11/105; E05D 11/1078; E05D 7/08; E05D 3/02; E05F 7/08; E05F 1/12
See application file for complete search history.

(56) References Cited

U.S. PATENT DOCUMENTS

| | | | |
|---|---|---|---|
| 1,131,667 A | 3/1915 | Bommer | |
| 2,604,653 A | 7/1952 | Anderson et al. | |
| 2,840,848 A | 7/1958 | Hickey | |
| 3,063,089 A | 11/1962 | Greenman | |

(Continued)

FOREIGN PATENT DOCUMENTS

| | | | |
|---|---|---|---|
| CN | 106761090 A | * | 5/2017 |
| CN | 206655584 U | * | 11/2017 |

(Continued)

OTHER PUBLICATIONS

English machine translation of CN 106761090 Jiang (Year: 2017).*

*Primary Examiner* — Emily M Morgan
(74) *Attorney, Agent, or Firm* — Baker Donelson Bearman Caldwell & Berkowitz, PC

(57) ABSTRACT

A pivot hinge includes a spring housing with a central tube, a spring assembly, an upper mounting plate, and a lower mounting plate. The bottom end includes a knurled outer surface. A stop cam is positioned about the knurled outer surface and has an inner surface that conform to the knurled outer surface so that it may be positioned in a plurality of rotatable positions relative to the central tube. The stop cam also has an exterior surface which includes a detent. The different rotational positions of the stop cam upon the knurled outer surface changes the relative position of the detent in relationship to the central tube. A cam follower assembly is coupled to the lower mounting plate and has a cam follower plate with a cam follower that rides upon the stop cam and engages the detent recess to hold the door in an open position.

17 Claims, 3 Drawing Sheets

(56) References Cited

U.S. PATENT DOCUMENTS

| | | | | |
|---|---|---|---|---|
| 3,107,758 | A * | 10/1963 | Benham | E05F 1/1223 49/386 |
| 3,263,365 | A | 8/1966 | Eckel | |
| 3,292,204 | A | 12/1966 | Tansey | |
| 3,518,716 | A | 7/1970 | Larson | |
| 3,733,650 | A | 5/1973 | Douglas | |
| 4,215,449 | A * | 8/1980 | Loikitz | E05F 1/1223 16/303 |
| 4,631,777 | A | 12/1986 | Takimoto | |
| 4,951,351 | A * | 8/1990 | Eckel | E05F 1/1223 16/314 |
| 5,138,743 | A | 8/1992 | Hoffman | |
| 5,682,644 | A | 11/1997 | Bohacik et al. | |
| 5,970,819 | A | 10/1999 | Katoh | |
| 6,065,187 | A | 5/2000 | Mischenko | |
| 6,374,458 | B1 | 4/2002 | Finkelstein | |
| 6,394,687 | B1 * | 5/2002 | Lee | E05D 11/1078 403/92 |
| 6,862,779 | B1 | 3/2005 | Lu et al. | |
| 6,920,668 | B2 | 7/2005 | Hayashi | |
| 6,990,772 | B2 | 1/2006 | Eckel et al. | |
| 6,999,772 | B2 | 2/2006 | Song et al. | |
| 7,111,361 | B2 | 9/2006 | Li et al. | |
| 7,111,363 | B2 | 9/2006 | Lee et al. | |
| 7,401,382 | B2 | 7/2008 | Luo | |
| 7,480,961 | B2 | 1/2009 | Yang | |
| 7,509,709 | B2 | 3/2009 | Chung | |
| 7,526,894 | B2 | 5/2009 | Falato et al. | |
| 7,926,146 | B2 | 4/2011 | Duan et al. | |
| 7,945,996 | B2 | 5/2011 | Gunderson | |
| 8,056,186 | B2 | 11/2011 | Zhang et al. | |
| 8,381,357 | B2 | 2/2013 | Zinn | |
| 8,621,714 | B2 | 1/2014 | Duan et al. | |
| 8,635,357 | B2 | 1/2014 | Ebersviller | |
| 8,683,655 | B2 | 4/2014 | Hong | |
| 8,701,248 | B2 | 4/2014 | Dries | |
| 9,222,293 | B2 | 12/2015 | Jenkinson | |
| 9,291,385 | B2 | 3/2016 | Hwang et al. | |
| 9,617,772 | B1 * | 4/2017 | Chen | E05D 3/02 |
| 9,739,523 | B1 * | 8/2017 | Augsburger | E05D 3/02 |
| 10,920,474 | B2 * | 2/2021 | Shinmura | E05F 1/1223 |
| 2003/0115719 | A1 * | 6/2003 | Lee | E05D 11/1078 16/335 |
| 2007/0101543 | A1 | 5/2007 | Lu et al. | |
| 2011/0302743 | A1 | 12/2011 | Kim et al. | |
| 2014/0145576 | A1 * | 5/2014 | White | A47B 96/00 312/319.1 |
| 2015/0345203 | A1 | 12/2015 | Vanini | |
| 2016/0083993 | A1 | 3/2016 | Grewe et al. | |
| 2016/0273251 | A1 * | 9/2016 | Malott | E05F 1/1215 |
| 2021/0363804 | A1 * | 11/2021 | Mitchell | E05D 11/1014 |
| 2021/0363805 | A1 * | 11/2021 | Mitchell | E05F 3/18 |
| 2022/0034135 | A1 * | 2/2022 | Mitchell | F25D 23/028 |

FOREIGN PATENT DOCUMENTS

| | | | | | |
|---|---|---|---|---|---|
| CN | 109695391 | A | * | 4/2019 | E05D 11/1064 |
| CN | 110195959 | A | * | 9/2019 | E05D 11/105 |
| DE | 29918633 | U1 | * | 1/2000 | E05D 11/1078 |
| KR | 20160023741 | A | * | 3/2016 | F25D 23/02 |
| KR | 20220018704 | A | * | 2/2022 | F25D 23/028 |
| WO | WO-2014112867 | A1 | * | 7/2014 | E05D 11/082 |
| WO | WO-2016124919 | A1 | * | 8/2016 | E05D 11/00 |

* cited by examiner

PIVOT HINGE

TECHNICAL FIELD

This invention relates generally to pivot hinges, and more particularly to pivot hinges used for commercial reach-in type refrigerator doors.

BACKGROUND OF INVENTION

Walk-in cold rooms, such as walk-in coolers, freezers, or other refrigerated environments such as reach-in refrigerators, are common in various industries, including convenience store, supermarkets and grocery stores, commercial kitchens, and other food service facilities. These cold rooms typically have a front door which is opened so that a person may reach into the refrigerated space and select an item.

These types of doors use a pivot hinge which forces the door closed to aid in returning an open door to its fully closed position. These pivot hinges include a spring to actuate the door closing movement. The problem with these pivot hinges is that they usually are adapted to also allow for the temporary stopping or dwelling of the door closing action. As such, these pivot hinges have included a bottom bracket with a detent or dwell point created by an internal, cylindrical cam assembly. As such, the door has to rise slightly to seat the detent in the open position, which can cause wear on the components of the door.

Another problem with these pivot hinges is that they are not adjustable so that the door open or dwell position may be changed, for example the desire to change the dwell point or position from 90 degrees open to 120 degrees open.

Another problem with these pivot hinges is that the pivot pin is mounted within a central tube wherein the top end of the metal pin extended through an opening in the top end of the central tube. This configuration created a metal to metal contact between the pivot pin and the central tube, which caused wear over time that created a misalignment therebetween. The top opening also included a flange to provide more bearing surface, however, over time this flange wears or breaks, thereby causing a misalignment of the pivot pin. This configuration also created a gap between the pivot pin and central tube which could allow dirt or insulating foam to intrude into the central tube.

Yet another problem with these pivot hinges is that the spring mounted about the pivot pin is prevented from moving relative to the central tube by simply having an end of the spring extend through a small hole in the top end of the central tube. However, as the spring is compressed, the end of the spring may move downwardly out of the hole in the central tube, causing the spring to be released. Also, the small hole spring mounting hole in the central tube is also difficult to manufacture as it cannot be created during the molding process.

Accordingly, there is a need in the art for a pivot hinge that will allow for different door open positions, will not cause the door to rise upon reaching a dwell point position, and will not cause excessive wear. It is to the provision of such therefore that the present invention is primarily directed.

SUMMARY OF THE INVENTION

In a preferred form of the invention a pivot hinge for use with a refrigerator door and a door jamb. The pivot hinge comprises a tubular housing, the tubular housing having an end with an exterior surface having a select configuration.

The tubular housing also has a stop cam movably coupled to the tubular housing end. The stop cam has an interior surface having a select configuration co-ordinating to the select configuration of the tubular housing exterior surface. The exterior surface select configuration and the interior surface select configuration prevents rotational movement between the tubular housing end and the stop cam to allow a plurality of fixed rotational positions between the tubular housing end and the stop cam. The stop cam also has an exterior surface including a round portion and a detent portion. The pivot hinge also has a first mount fixedly coupled to the tubular housing and mountable to a door, a second mount mountable to a door jamb, and a spring assembly rotatably mounted to the tubular housing and coupled to the second mount. The spring assembly includes a pivot pin and a torsion spring coupled to the pivot pin. A cam follower assembly is mounted to the second mount. The cam follower assembly has a cam follower riding upon the stop cam exterior surface and set to mate with the detent portion to resist rotary movement of the upper mounting plate relative to the lower mounting plate at a select rotary position therebetween.

DETAILED DESCRIPTION

Figure 1:
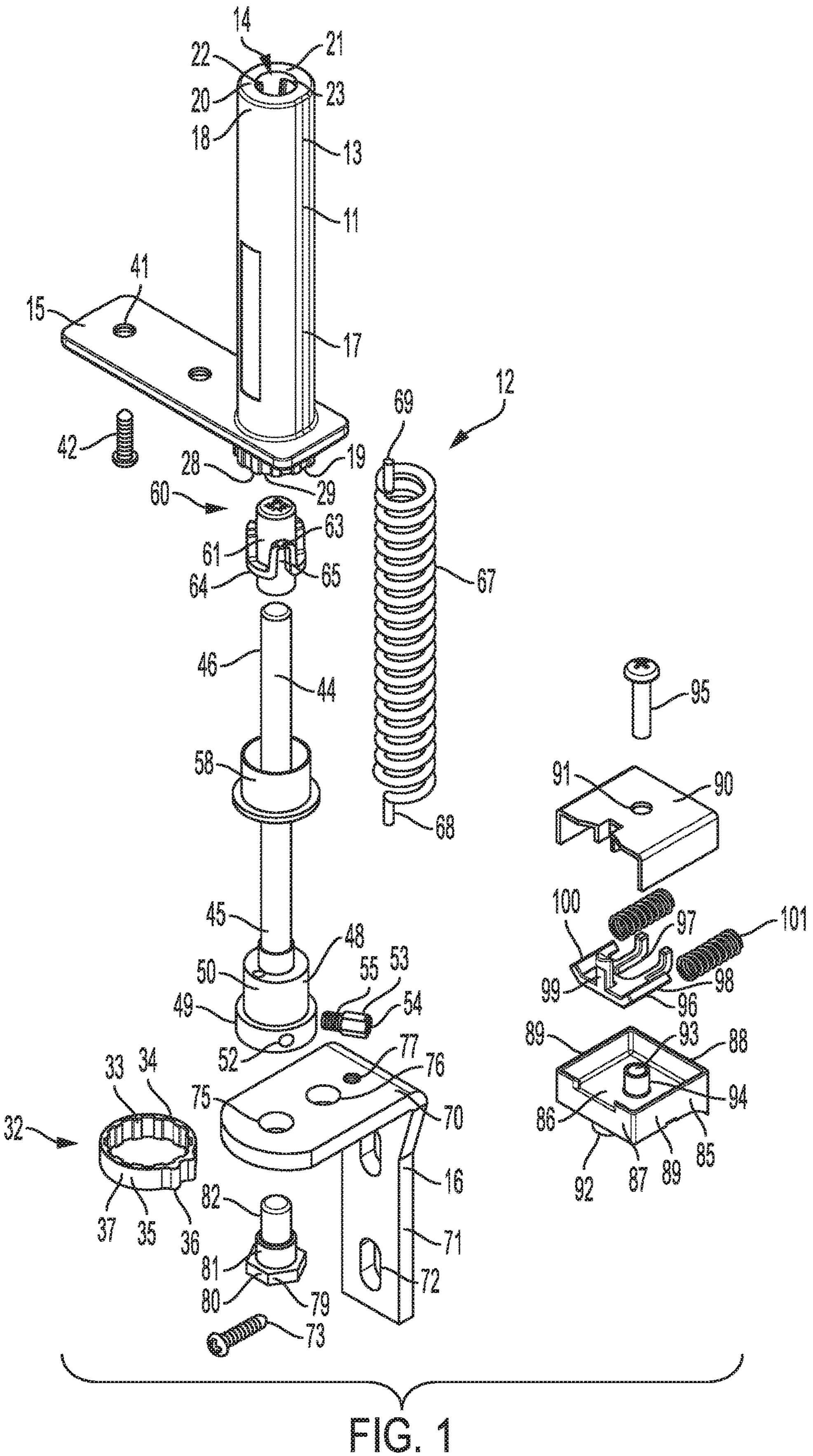
FIG. 1 is an exploded, perspective view of a door pivot hinge embodying principles of the invention in a preferred form.

With reference next to the drawings, there is shown a pivot hinge 10 according to the present invention. It is to be appreciated that the pivot hinge 10 shown in the drawings is configured for use with a reach-in type cool room, reach-in, refrigerator or freezer door, referenced hereinafter collectively as a refrigerator.

Figure 2:
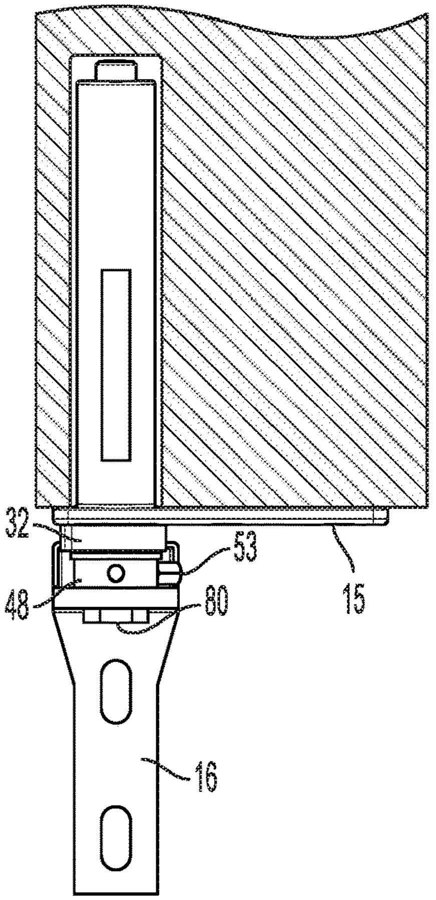
FIG. 2 is a front view of the door pivot hinge of FIG. 1.
Figure 3:
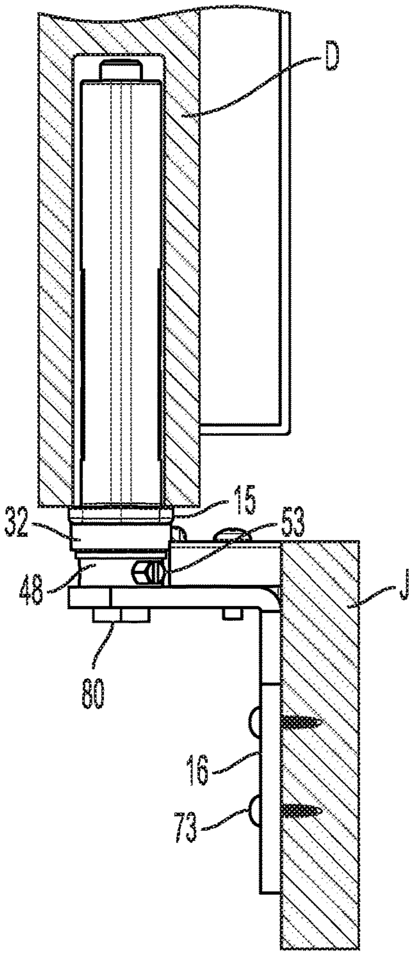
FIG. 3 is a side view of the door pivot hinge of FIG. 1.
Figure 4:
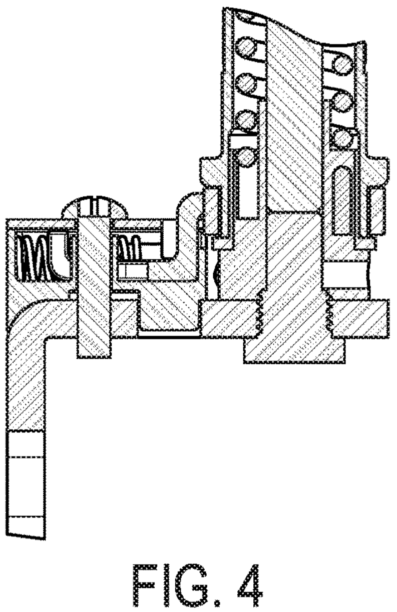
FIG. 4 is a cross-sectional view of a portion of the door pivot hinge of FIG. 1.
Figure 5:
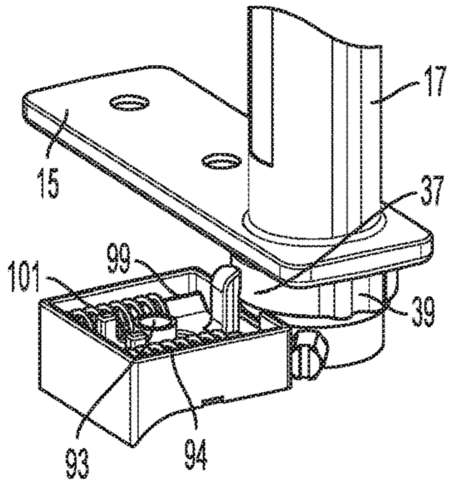
FIG. 5 is perspective view of the door pivot hinge of FIG. 1, shown with a portion removed for clarity.

The pivot hinge 10 includes a metallic exterior spring housing 11, an interior spring assembly 12 positioned within the exterior housing 11, an upper mounting plate, bracket or flange 15 fixedly mounted to the spring housing 11, and a lower mounting plate, bracket or flange 16 coupled to the spring assembly 12. The upper mounting plate 15 is mounted to the refrigerator door D while the lower mounting plate 16 is mounted to the door jamb J, as shown in FIGS. 2 and 3.

The spring housing 11 includes a cylindrical, central tube 17 having a central interior channel 14, a top end 18 and a bottom end 19 position beneath the upper mounting plate 15. The top end 18 includes a top end wall 20 having a central top opening 21 and the interior channel thereat having three equally spaced steps 22 extending downwardly from the central opening 21. The steps 22 define grooves 23 between each adjacent pairs of steps 22. The bottom end 18 includes a bottom opening 26, and a knurled outer or exterior surface 27 having an exterior configuration of a radial array of knurls or ridges 28 defining grooves 29 between adjacent ridges 28.

A metallic, annular ring or stop cam 32 is removably positioned about the knurled exterior or outer surface 27. The stop cam 32 includes an interior or inner surface having an interior configuration having knurls or ridges 33 that are received within grooves 29, and grooves 34 that receive outer surface ridges 28, i.e., the stop cam inner surface meshes, mates with, or is in register with the central tube knurled outer surface 27. The stop cam 32 is removably mounted to the outer surface 27 so that it may be removed and stationarily re-positioned in a plurality of rotatable positions relative to the central tube 17. The stop cam 32 also has an exterior or outer surface 35 which includes a detent 36 extending from an otherwise round surface or portion 37. The detent 36 has two outwardly extending detent ridges 38 which define a dwell spot, detent recess, or valley 39 therebetween. The different rotational positions of the stop cam 32 upon the knurled outer surface 27 changes the relative position of the detent 36 in relationship to the central tube 17.

The upper mounting plate 15 extends generally perpendicular to the spring housing 11. The upper mounting plate 15 includes two screw mounting holes 41 through which mounting screws 42 extend and are mounted to the door D.

The interior spring assembly 12 includes an elongated shaft, rod or pin 44 having a lower or bottom end 45 and an upper or top end 46. The bottom end 45 is coupled to a metallic annular collar 48 having an enlarged first portion 49 configured to abut the bottom end 19 of the central tube 17, and a narrower second portion 50 configured to be received within the bottom opening 26 of the central tube 17. The first portion 49 has a smooth, central, bottom mounting hole 51. The first portion 49 also includes three threaded, equally spaced, tensioning screw holes 52. One tensioning screw hole 52 receives a tension screw 53 having an enlarged head 54 and a threaded shaft 55 which is threaded into tensioning screw hole 52. The selection of which tensioning screw hole 52 receives the tension screw 53 depends on the set-up of the pivot hinge during initial mounting. The second portion 50 has a top surface which includes a spring mounting hole 56. A flanged nylon collar bushing 58 is positioned upon the second portion 50 to provide a smooth rotation of contact between the collar 48 and the central tube 17 and upper mounting plate 15.

The top end 46 of the elongated pin 44 is telescopically received within a central channel 59 of a nylon spring bushing 60 having cylindrical main portion 61 and a undulating ridge 62 forming three radially positioned high areas or tongues 63 and three radially positioned low areas, troughs or grooves 64. The grooves 64 are configured to receive or mesh with the interior steps 22 of the central tube 17 to prevent relative rotation between the spring bushing 60 and the central tube 17. Each tongue 63 also includes a spring mounting recess 65 therein. The top end of the cylindrical main portion 61 extends through and is journalled within the top opening 21 of the central tube 17.

A coiled, helical torsion spring 67 is positioned about the elongated pin 44. The torsion spring 67 has a lower end or tang 68 which is received within the spring mounting hole 56 of the collar 48, and an upper end or tang 69 which is received within one spring mounting recess 65 of the spring bushing 60. With the torsion spring 67 mounted in this manner, relative rotation between the collar 48 and the central tube 17 causes a compression of the torsion spring 67.

The lower mounting plate 16 is generally L-shaped with a horizontal portion 70 and a vertical portion 71 extending from the horizontal portion 70. The vertical portion 71 includes two screw mounting holes 72 therethrough through which extends mounting screws 73 that are threaded into the door jamb J. The horizontal portion 70 has a threaded first mounting hole 75, a second mounting hole 76, and a threaded third mounting hole 77 therethrough. The first mounting hole 75 acts as a spring assembly mounting hole configured to receive a mounting bolt 79 having a head 80, a threaded first shaft portion 81 and a smooth second shaft portion 82. The first threaded mounting hole 75 is sized to threadably receive the threaded first shaft portion 81 while the second shaft portion 82 is journalled for rotational movement within the collar bottom mounting hole 51.

A cam follower assembly 84 is coupled to the horizontal portion 70 of the lower mounting plate 16. The cam follower assembly 84 includes a generally box-shaped main housing 85 having a floor 86, a front wall 87, a rear wall 88 and two side walls 89. A housing lid 90 is positioned upon the top of the main housing 85. The housing lid 90 has a mounting hole 91 therethrough. The floor 87 has a downwardly depending mounting post 92 configured to be received within the second mounting hole 76 of horizontal portion 70. The floor 86 also has a mounting hole 93 that also extends through a boss 94 that is provided for additional support. Floor mounting hole 93 is aligned with the threaded third mounting hole 77 of the horizontal portion 70 and the housing lid mounting hole 91. A mounting screw or bolt 95 extends through the housing lid mounting hole 91, through floor mounting hole 93 and is threaded into the third mounting hole 77 of lower mounting plate 16 to secure the cam follower assembly 84 in place. The combination of the post 92 and mounting screw 95 within the second and third mounting holes 76 and 77 prevents the rotation of the cam follower assembly relative to the horizontal portion 70.

The cam follower assembly 84 also has a reciprocating cam follower plate 96 positioned within the main housing 85. The cam follower plate 96 has an elongated groove 97 configured to slidably receive boss 94. The cam follower plate 96 includes two spring retaining posts 98 and a inverted L-shaped cam follower 99 having a cam bearing surface 100. A coil spring 101 is mounted to each of the two spring retaining posts 98, that are compressed between the cam follower plate 96 and the rear wall 88 so as to bias the cam follower plate 96 in the direction of the front wall 87. The cam follower 99 contacts and rides upon the outer surface 35 of the stop cam 32. Specifically, the cam bearing surface 100 remains in the contact with, or at least close proximity to, the stop cam outer surface 35.

In use, the pivot hinge 10 is mounted to a door D by positioning the spring housing 11 into a channel within the door D, then passing mounting screws 42 through the screw holes 41 of the upper mounting plate 15 and threading them into the bottom of the door D. The pivot hinge 10 is also mounted to the door jamb J by passing mounting screws 73 through mounting holes 72 and threading them into the door jamb J.

Once the pivot hinge 10 is mounted to the door and door jamb, the tension of the torsion spring 67 must be adjusted to provide the pivot hinge 10 with the proper amount of initial biasing force upon the door. To increase the spring tension or force, a tool is inserted into a collar hole 52 and the collar is rotated to increase the biasing force of torsion spring 67 so that a tension screw 53 is inserted into the collar hole 52 which when the collar 48 is moved clockwise, as shown in FIGS. 6-9, the tension screw 53 will provide the correct initial tension upon its release and subsequent abutment against the cam follower assembly 84 while under tension from the torsion spring 67 in the counterclockwise direction. It should be understood that the direction of rotation described herein is in reference to the drawings, and that such may be reversed should the pivot hinge be used to shut a door oriented in the opposite direction.

With the pivot hinge 10 properly mounted and the torsion spring 67 tensioned, the manual movement of the door D from a closed position to an open position causes the door to rotate the upper mounting plate 15, thereby rotating the underlying spring bushing 60, which in turn, rotates the top end of the torsion spring 67. The rotation of the top portion (upper tang 69) of the torsion spring 67 while the bottom portion (lower tang 68) of the torsion spring remaining stationary causes the torsion spring 67 to further coil, tighten, load or compress so as to create a further or greater spring biasing force in the opposite (door closing) rotational direction.

Figure 6:
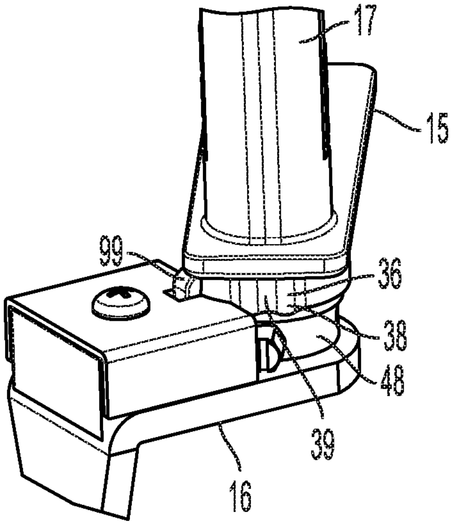
FIG. 6 is a perspective view of the door pivot hinge of FIG. 1, shown with the hinge in a first position.
Figure 7:
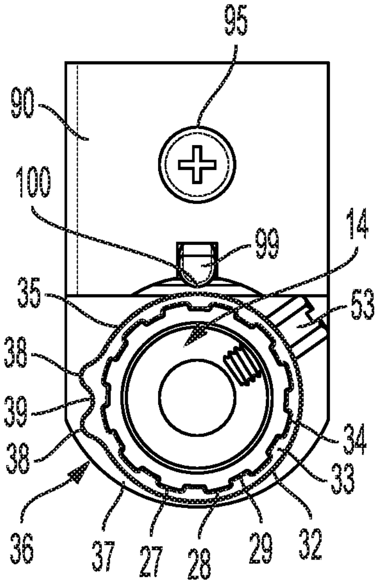
FIG. 7 is a top view of the door pivot hinge of FIG. 1, shown with the hinge in a first position.
Figure 8:
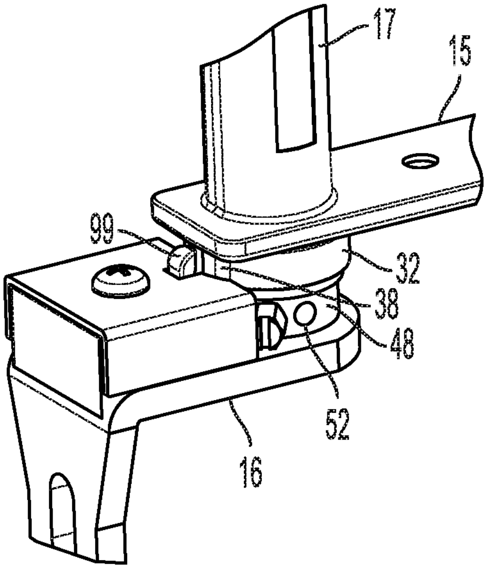
FIG. 8 is a perspective view of the door pivot hinge of FIG. 1, shown with the hinge in a second position.
Figure 9:
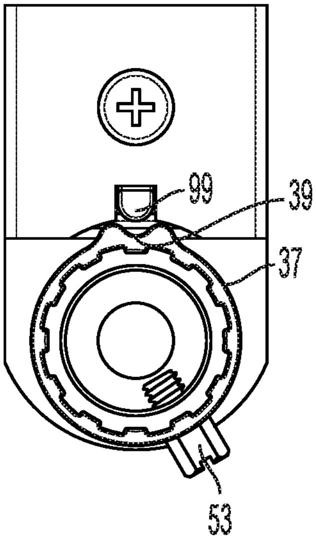
FIG. 9 is a top view of the door pivot hinge of FIG. 1, shown with the hinge in a second position.

As the central tube 17 rotates relative to the stationary lower mounting plate 16, the cam follower 99 initially is very close to or lightly rides upon the rotating round portion 37 of the stop cam 32, as shown in FIGS. 6 and 7. As the door approaches the desired stop, dwell, or hold open point or position, the cam follower 99, specifically the bearing surface 100, rotatably rides over the approaching detent ridge 38 and drops into the dwell recess 39 between the two detent ridges 38. The cam follower 99 is allowed to ride over the detent ridge 38 due to the reciprocating movement of the cam follower plate 96 and the biasing force created by springs 101 in the direction towards the stop cam 32, which forces the cam follower 99 into the dwell recess 39, as shown in FIGS. 8 and 9. With the cam follower 99 positioned within the dwell recess 39, the door remains stationary as the biasing force of the torsion spring 67 alone does not overcome the resistance created between the cam follower 99 and the detent ridges 38.

Should it be desired to close the door D, a person simply manually commences door movement towards the door closed position. The additional manual force overcomes the selective restrictive or resistive engagement between the cam follower 99 and the detent ridge 38, causing the cam follower 99 to ride over the detent ridge 38 and subsequently ride back onto the round portion 37 of the stop cam outer surface 35. Thus, the combination of the cam and cam follower provides a resistive engagement therebetween which is overcome by the manual force applied to the door during the closing motion. With the cam follower 99 in a position upon the round portion 37, the biasing force of the torsion spring 67 causes the rotation of the central tube 17 in the door closing direction, which is the counter-clockwise direction in FIGS. 6-9. The door moves in this direction until the door once again abuts the door jamb J, wherein the torsion spring 67 provides a rotational biasing force which maintains the seal between the door and the door jamb.

The ability of the multi-positionable stop cam 32, due to the multiple matching or meshing configurations of the stop cam interior surface ridges 33 and grooves 34 with the corresponding grooves 29 and ridges 28 of the central tube outer surface 27, allows the stop or dwell point of the door D to be easily and potentially repeatedly changed. For example, the dwell point shown in the drawings of FIG. 7 illustrates a door open stop or dwell point of approximately 90 degrees, as the detent 36 is offset from the cam follower 99 by approximately 90 degrees. However, the dwell point may be increased by simply rotating the stop cam 32 relative to the central tube 17 to a point wherein the stop cam interior surface ridges 33 and grooves 34 again mesh with the corresponding grooves 29 and ridges 28 of the central tube outer surface 27. This may be done by simply raising the door D slightly so that the central tube 17 raises relative to the vertically stationary collar 48 to allow the stop cam 32 to move downwardly and out of meshed engagement with the central tube outer surface 27. The stop cam is then rotated and repositioned upon the central tube outer surface 27, and the door then lowered so that the collar bushing 58 once again abuts the stop cam 32.

As the drawings show a stop cam 32 and outer surface 27 having twelve corresponding ridges and grooves, there are twelve possible meshed stationary positions offset from each other by 30 degrees. It should be understood that the number of matching or stationary positions may vary depending on the desired flexibility in choosing the dwell point of the door, by reconfiguring the number of ridges and grooves or otherwise reconfiguring the interior surface configuration of the stop cam and the exterior surface of the central tube. For example, the mutual surfaces may take on a non-round configuration of a square, thus providing four matching or meshing positions between the stop cam and the central tube.

It should be understood that the inclusion of the spring bushing 60 provides for a plastic bearing surface between the top end of the pin 44 and the central top opening 21 of the central tube 17. This eliminates the metal to metal contact associated with pivot hinges and the complications associated with providing a spring hole in the central tube of the prior art. This also provides for more flexibility of choosing a spring position as the spring upper tang 69 may be positioned in any one of the three grooves 64. This also avoids the necessity of a flange associated with the top opening 21, which tends to wear or break over time.

While not as desirous, the stop cam 32 may be prevented from rotating through the use of a set screw instead of the previously described meshing surfaces between the stop cam interior surface and the central tube exterior surface 27.

It should be understood that the pivot hinge may be inverted and mounted to an upper portion of the door, rather than a lower portion of the door shown in the illustrations. Hence, the terms upper, lower, raise, top, bottom, or any other term referencing a direction or orientation is in reference to the drawings and is not to be construed as a limitation.

It should be understood that the cam may include a protrusion rather than a detent while the cam follower includes a recess rather than a protrusion. Thus, the cam would fall within a spring biased recess to maintain the dwell position of the door.

While this invention has been described in detail with particular reference to the preferred embodiment thereof and the best mode of practicing same, it will be understood that variations and modifications can be effected within the spirit and scope of the invention as described herein above and as set forth in the appended claims.

The invention claimed is:

1. A pivot hinge for use with a refrigerator door coupled to a door jamb, the pivot hinge comprising, a tubular housing having an end with an exterior surface having a select exterior configuration, said tubular housing also having a stop cam movably coupled to said tubular housing end, said stop cam having an interior surface having a select interior configuration engaging said select exterior configuration of said tubular housing exterior surface to prevent rotational movement between said tubular housing end and said stop cam when mated and allow a plurality of fixed rotational positions between said tubular housing end and said stop cam, said stop cam also having an exterior surface including a round portion and a detent portion;

a first mount fixedly coupled to said tubular housing and mountable to a door;

a second mount mountable to a door jamb;

a spring assembly including a pivot pin and a torsion spring coupled to said pivot pin, said torsion spring having an end coupled to said tubular housing and another end coupled to said pivot pin, and a cam follower assembly mounted to said second mount, said cam follower assembly having a cam follower riding upon said stop cam exterior surface and configured to mate with said detent portion to resist rotary movement of said tubular housing relative to said lower mounting plate at a select rotary position therebetween.

2. The pivot hinge of claim 1 wherein said select exterior configuration of said exterior surface of said tubular housing end includes a plurality of ridges forming grooves between adjacent ridges, and wherein said select interior configuration of said stop cam interior surface includes a plurality of ridges configured to be received within said exterior surface grooves.

3. The pivot hinge of claim 1 wherein said detent portion includes a detent recess configured to receive said cam follower.

4. The pivot hinge of claim 3 wherein said detent recess is formed by and between adjacent detent ridges.

5. The pivot hinge of claim 1 wherein said cam follower assembly includes a housing, a reciprocating cam follower plate positioned within said housing and including said cam follower, and at least one spring positioned within said housing and biasing said cam follower plate towards said stop cam.

6. The pivot hinge of claim 1 further comprising a spring bushing having a central channel configured to telescopically receive a top end of said pivot pin, and wherein said tubular housing includes a top opening configured to telescopically receive a top end of said spring bushing.

7. The pivot hinge of claim 6 wherein said spring bushing includes at least on spring groove configured to receive an end of said torsion spring.

8. The pivot hinge of claim 6 wherein said tubular housing has at least one step, and wherein said spring bushing has at least one groove configured to receive said step.

9. A pivot hinge for coupling a refrigerator door to a doorjamb, the door closer comprising, a tubular housing adapted to be coupled to a door;

a spring assembly mounted within said tubular housing, said spring assembly including a pivot pin rotatably coupled to said tubular housing, a collar non-rotatably fixed to said pivot pin, a helical spring having one end coupled to said tubular housing and another end coupled to said collar, and a first mounting plate coupled to said collar;

a first cam portion coupled to said tubular housing, and a spring biased second cam portion coupled to said mounting plate for resistive engagement with said first cam portion to selectively restrict rotational movement of said tubular housing relative to said first mounting plate.

10. The pivot hinge of claim 9 wherein said first cam portion includes a ring mounted to said tubular housing having a detent, and wherein said second cam portion includes a reciprocating cam follower configured to be received within said detent.

11. The pivot hinge of claim 10 wherein said ring is repositionable in a plurality of stationary rotational positions relative to said tubular housing.

12. The pivot hinge of claim 11 wherein said ring has an interior surface with a select interior configuration and said tubular housing has an exterior surface with a select exterior configuration meshing with said select interior configuration of said interior surface of said ring to prevent rotation between said ring and said tubular housing.

13. The pivot hinge of claim 12 wherein said select exterior configuration of said exterior surface of said tubular housing includes a plurality of ridges forming grooves between adjacent ridges, and wherein said select interior configuration of said ring interior surface includes a plurality of ridges configured to be received within said exterior surface grooves.

14. The pivot hinge of claim 11 wherein said detent is formed by two adjacent detent ridges extending outwardly from said ring.

15. The pivot hinge of claim 9 wherein said second cam portion includes a housing, a reciprocating cam follower plate positioned within said housing and including a cam follower, and at least one spring positioned within said housing and biasing said cam follower plate towards said ring.

16. The pivot hinge of claim 9 further comprising a spring bushing having a central channel configured to telescopically receive a top end of said pivot pin, and wherein said tubular housing includes a top opening configured to telescopically receive a top end of said spring bushing.

17. The pivot hinge of claim 16 wherein said spring bushing includes at least on spring groove configured to receive an end of said torsion spring.

* * * * *